(12) United States Patent
Antkowiak et al.

(10) Patent No.: US 11,439,278 B2
(45) Date of Patent: Sep. 13, 2022

(54) SPIRAL CUTTING ACCESSORY

(71) Applicant: BREVILLE PTY LIMITED, Alexandria (AU)

(72) Inventors: Margaret Antkowiak, Bronte (AU); Mark Thomas, Leichhardt (AU)

(73) Assignee: BREVILLE PTY LIMITED, Alexandria (AU)

( * ) Notice: Subject to any disclaimer, the term of this patent is extended or adjusted under 35 U.S.C. 154(b) by 0 days.

(21) Appl. No.: 15/779,817

(22) PCT Filed: Dec. 16, 2016

(86) PCT No.: PCT/AU2016/051250
§ 371 (c)(1),
(2) Date: May 29, 2018

(87) PCT Pub. No.: WO2017/100859
PCT Pub. Date: Jun. 22, 2017

(65) Prior Publication Data
US 2018/0353014 A1    Dec. 13, 2018

(30) Foreign Application Priority Data
Dec. 18, 2015    (AU) ................................. 2015905283

(51) Int. Cl.
A47J 43/08    (2006.01)
A47J 43/07    (2006.01)
B26D 3/11    (2006.01)

(52) U.S. Cl.
CPC ......... *A47J 43/085* (2013.01); *A47J 43/0722* (2013.01); *B26D 3/11* (2013.01)

(58) Field of Classification Search
CPC ........ A47J 43/085; A47J 43/0722; B26D 3/11
See application file for complete search history.

(56) References Cited

U.S. PATENT DOCUMENTS

| 2,414,152 | A | | 1/1947 | Jackson | |
|---|---|---|---|---|---|
| 3,892,365 | A | * | 7/1975 | Verdun | A47J 43/06 241/92 |
| 8,677,895 | B2 | * | 3/2014 | Beber | A47J 43/0711 99/537 |
| 2011/0185917 | A1 | * | 8/2011 | Goderiaux | A47J 36/165 99/348 |

(Continued)

FOREIGN PATENT DOCUMENTS

| BE | 568070 A | 6/1958 |
|---|---|---|
| DE | 35 46 506 A1 | 3/1987 |

(Continued)

OTHER PUBLICATIONS

Williams Sonoma, Breville Sous Food Processor, Aug. 24, 2012, https://www.youtube.com/watch?v=3DIIH97ywIQ (Year: 2012).*

(Continued)

*Primary Examiner* — Jessica Cahill
*Assistant Examiner* — Bobby Yeonjin Kim
(74) *Attorney, Agent, or Firm* — Tarolli, Sundheim, Covell & Tummino LLP (57) ABSTRACT

A cutting accessory for a food processor has a body that fits within the food processor's bowl and lid. The body supports a cutting disc that is offset to the food processor's spindle. The cutting disc is driven by the rotation of the spindle.

16 Claims, 6 Drawing Sheets

(56) References Cited

U.S. PATENT DOCUMENTS

| | | | | |
|---|---|---|---|---|
| 2014/0165408 A1* | 6/2014 | Schillheim | .......... | A47J 43/0705 |
| | | | | 30/151 |
| 2015/0003190 A1* | 1/2015 | Pendleton | .......... | B01F 7/00858 |
| | | | | 366/314 |
| 2016/0101533 A1* | 4/2016 | Aramburo | .......... | A47J 43/0722 |
| | | | | 83/675 |

FOREIGN PATENT DOCUMENTS

| | | |
|---|---|---|
| DE | 36 44 267 A1 | 7/1988 |
| GB | 2 497 085 A | 6/2013 |

OTHER PUBLICATIONS

Breville BFP800XL Sous Chef Food Processor, Sep. 20, 2011, Amazon, https://www.amazon.com/Breville-BFP800XL-Sous-Chef-Processor/dp/B005I6ZKCE, https://images-na.ssl-images-amazon.com/images/I/B1QwPZOQxFS.pdf (Year: 2011).*

International Search Report and Written Opinion for PCT/AU2016/051250, dated Jan. 24, 2017.

Extended European Search Report issued in European Patent Application No. 16874150.2, dated Jul. 5, 2019.

Office Action received for European Application No. 16874150.2 dated Sep. 18, 2020.

Communication pursuant to Article 94(3) issued in European Patent Application No. 16 874 150.2, dated Jun. 9, 2021.

* cited by examiner

SPIRAL CUTTING ACCESSORY

FIELD OF THE INVENTION

The invention relates to food processor accessories and more particularly to an accessory for spiral cutting.

BACKGROUND OF THE INVENTION

A food processor includes a base that supports a processing bowl. A spindle extends into the bowl. The spindle is driven by a motor in the base. The bowl is covered by lid having a feedtube. The spindle is adapted to carry a number of different cutting blades, referred to here as accessories. However, the typical spindle is driven by the motor in the base at approximately 1500 μm. In order to make continuous, longitudinal, helical spiral cuts in food such as vegetables ("spiral cuts"), a slower spindle speed is required.

OBJECTS AND SUMMARY

It is an object of the technology to provide an accessory for a food processor, the accessory being adapted to make spiral cuts.

Accordingly, there is provided an accessory comprising a body within which is located a power train. The power train couples to the food processor's spindle and serves to rotate a cutting disk at a slower rotational speed than the spindle. The spindle is offset from the cutting disk. The accessory fits within the bowl, beneath the lid. The cutting disk of the accessory is maintained in alignment with the lid's feedtube.

In preferred embodiments, the cutting disk is maintained in alignment with a secondary feed chute formed through an insert that is received by the feedtube.

BRIEF DESCRIPTION OF THE DRAWING FIGURES

In order that the invention be better understood, reference is now made to the following drawing figures in which.

DETAILED DESCRIPTION

Figure 1:
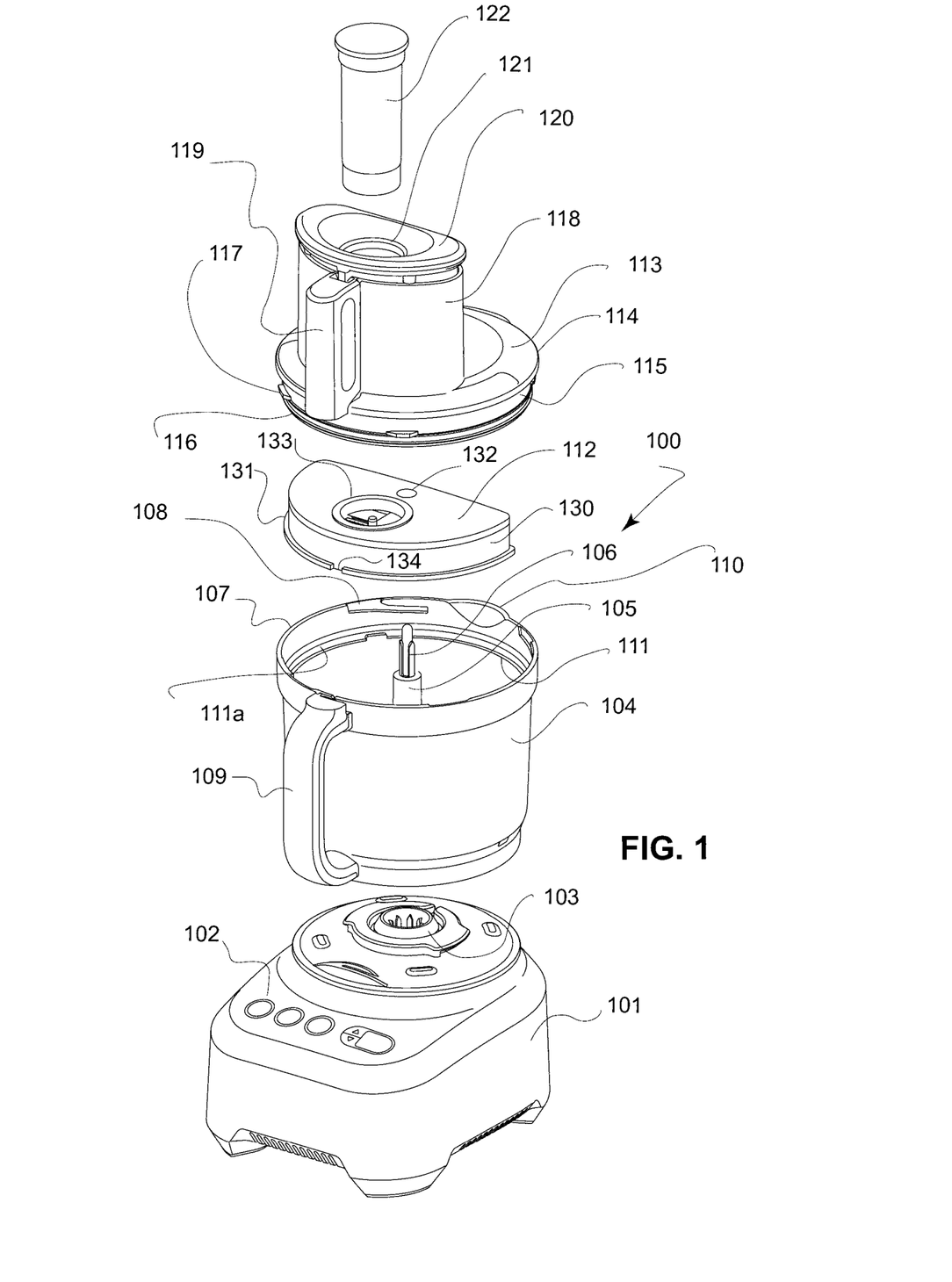
FIG. 1 is an exploded perspective view of a food processor having a spiral cutting accessory.

As shown in FIG. 1, a food processor 100 may have a conventional base 101, with an internal motor, external user interface 102 and a coupling component such as a female drive coupling 103. The top of the base 101 receives a bowl 104. An intermediate coupling associated with and often built into the bowl drives a removable food processor spindle 105. The upper end of the spindle has a metal tip with splines 106 that are used to engage a variety of accessories, as is well known in the art. The lower end of the spindle engages the intermediate coupling. The bowl 104 has a mouth opening or upper rim 107. Bayonet features, such as female bayonet features 108 are located below the rim 107 and are used to engage complimentary features of the lid and draw the lid into engagement with and seal with the rim 107. The bowl may have a handle 109 and a spout 110. Unlike a conventional bowl, the bowl, 104 in this example has an internal circumferential, rim or flange 111, having an upper surface 111a for supporting an accessory. As will be explained, the internal rim 111 will be used to support and locate a static spiral cutting accessory 112 in the space between the flange in and the underside of the bowl's lid 113.

The lid 113 has a rim 114 that rests on the mouth opening 107 when the lid is engaged with the bowl. The lid 113 has a cylindrical side wall 115 that supports one or more liquid seals 116 and complimentary bayonet features 117, as may be required to engage the bowl in the correct sealing position and alignment. The lid 113 has a feedtube 118 that may feature an auxiliary handle 119 within which may be located safety interlock features relating to safe operation of the motor in the base. In this example, the feedtube 118 is provided with an insert 120, the insert 120 provides a secondary feedchute 121, being circular in cross section and having a cooperating cylindrical pusher 122.

As suggested by FIG. 1, the spiral cutting accessory 112 has at least a portion of its external circumference 130 shaped and configured to closely cooperate with the interior surface of the bowl and be located by it. In the example of FIG. 1, the lower rim 131 of the accessory 112 rests squarely on the upper surface ma of the internal flange 111.

The accessory 112 has a through opening 132 that receives the terminal end 106 of the spindle 105. Rotation of the spindle causes the rotation of the accessory's offset cuffing disk 133. In this example, the cutting disk 133 is a removable spiral cutting accessory insert that is driven by a gear train located within the accessory 112. When located within the food processing bowl 104, on top of the internal flange rotation of the accessory 112 relative to the bowl is prevented with a mechanical interlocking. In this example, the lower rim 131 of the accessory 112 has a notch 134 that engages a generally vertical rib (not shown) located above and adjacent to the flange in the area of the top of the handle 109. Multiple ribs and notches may be provided.

Activation of the base's motor causes a rotation of the spindle 105. The machine quality splines 106 of this spindle drive the input or drive gear of a mechanical power train located within the accessory 112. The power train within the accessory reduces the rotational speed provided by the spindle to a lower rotational speed required by the cutting disk 133. In one example, food is loaded through the secondary curling chute 121 and urged into the cutting disk 133 by the pusher 122. Food is thus passed through the rotating cutting disk 133 and subsequently collected in the bowl 104. In preferred embodiments, the feedtube or the secondary cutting chute are the same diameter as the working diameter of the cutting disk, or smaller.

Figure 2:
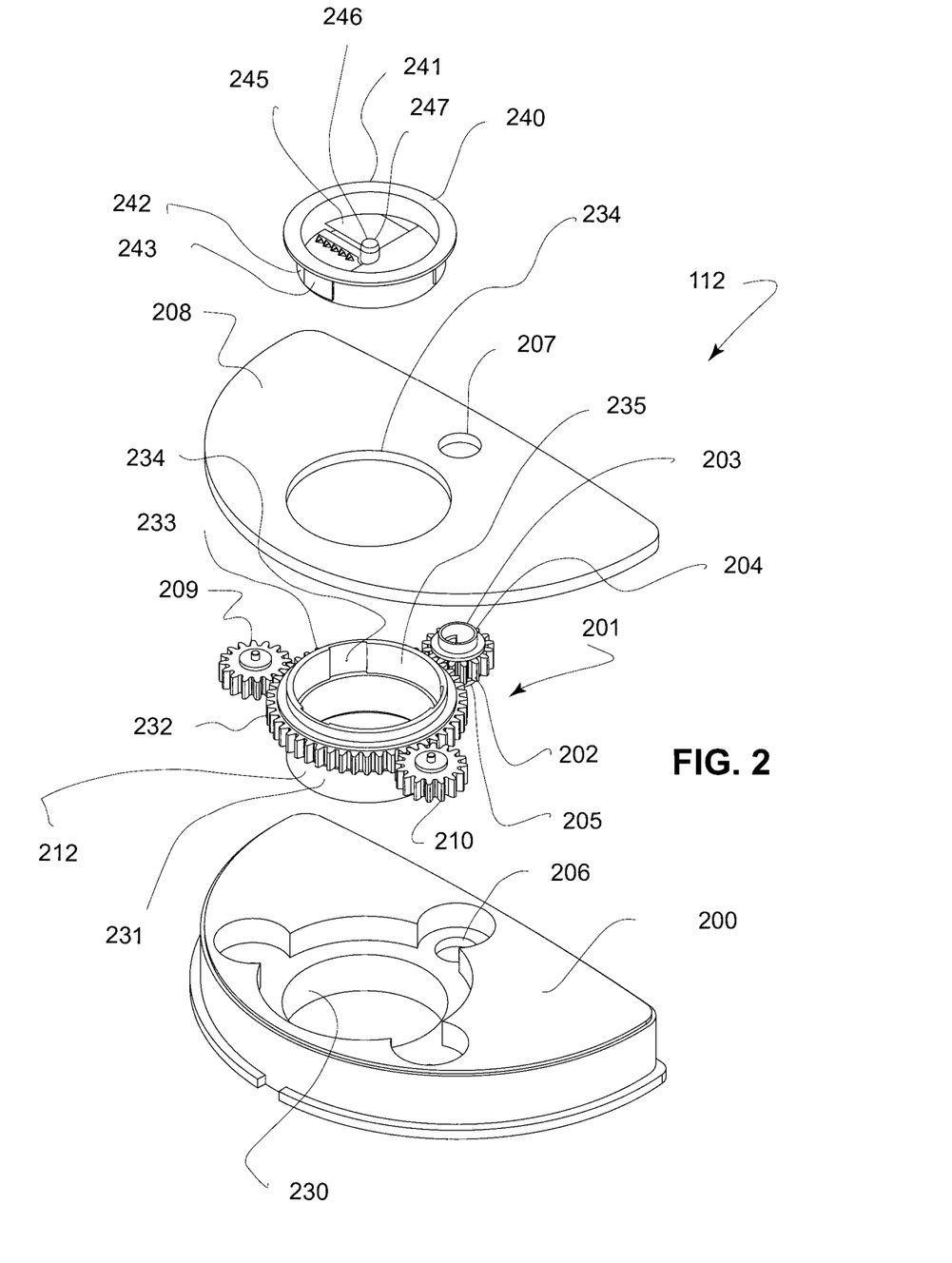
FIG. 2 is an exploded perspective view of the accessory depicted in FIG. 1.

As shown in FIG. 2, the spiral cutting accessory 112 has a main body 200 that is fully locatable within a food processor bowl cover. The accessory 112 is essentially immobilised relative to the bowl and lid within which it is contained. In this example, the power train 201 has an input or drive gear 202 that is located within the body 200. The drive gear 202 has a central bore 203 that mechanically engages with and is rotationally controlled by the splines 106 on the top of the spindle 105.

In this example, the central bore 203 has shoulders 204, 205 that are located and supported for rotation at one end by a bearing, journal or opening 206 in the body, and a second bearing, journal or opening 207 located in a cover or body component 208 that seals the interior of the accessory from the environment. In this example, the drive gear 204 form a fixed planet gear in a planetary gear type power train. In this example, two other fixed planet gears 209, 210 are supported within the accessory so all of the planet gears engage the sun gear 212 for rotation and location. As suggested by FIG. 2, the power train is supported and preferably sealed within the accessory so that rotating movement of the drive gear results in a gear reduction of the sun gear 212. In this example, the gear reduction is approximately 10:1.

The sun gear 212 is supported for rotation, in this example, by a through opening, journal, bearing, sleeve or fixture formed through the main body 200, generally illustrated by reference number 230. The journal 230 supports a first or lower sleeve 231 on the sun gear 212. On the other side of the sun gears array of teeth 232 there is located a second or upper sleeve 233 that is supported by a through opening 234 located on the cover 208. The sun gear 212 may also have features located in or along its bore 234, 235 for engaging, locating and driving a removable spiral cutting disk insert such as a spiral cutting disk insert 240. In this example, the cutting disk insert 240 has a perimetral flange 241 that sits above and may be supported by the upper surface of the cover 208. The cutting disk insert 240 has descending side walls, for example, cylindrical side walls 242 having optional engagement features 243 that may be driven by the sun gear 212. The cutting disk insert 240 supports one or more cutting blades 245 and may have a food centring or guide feature, here illustrated by an upright cylindrical or hollow post 246 having a sharpened or penetrating upper edge 247.

Figure 3:
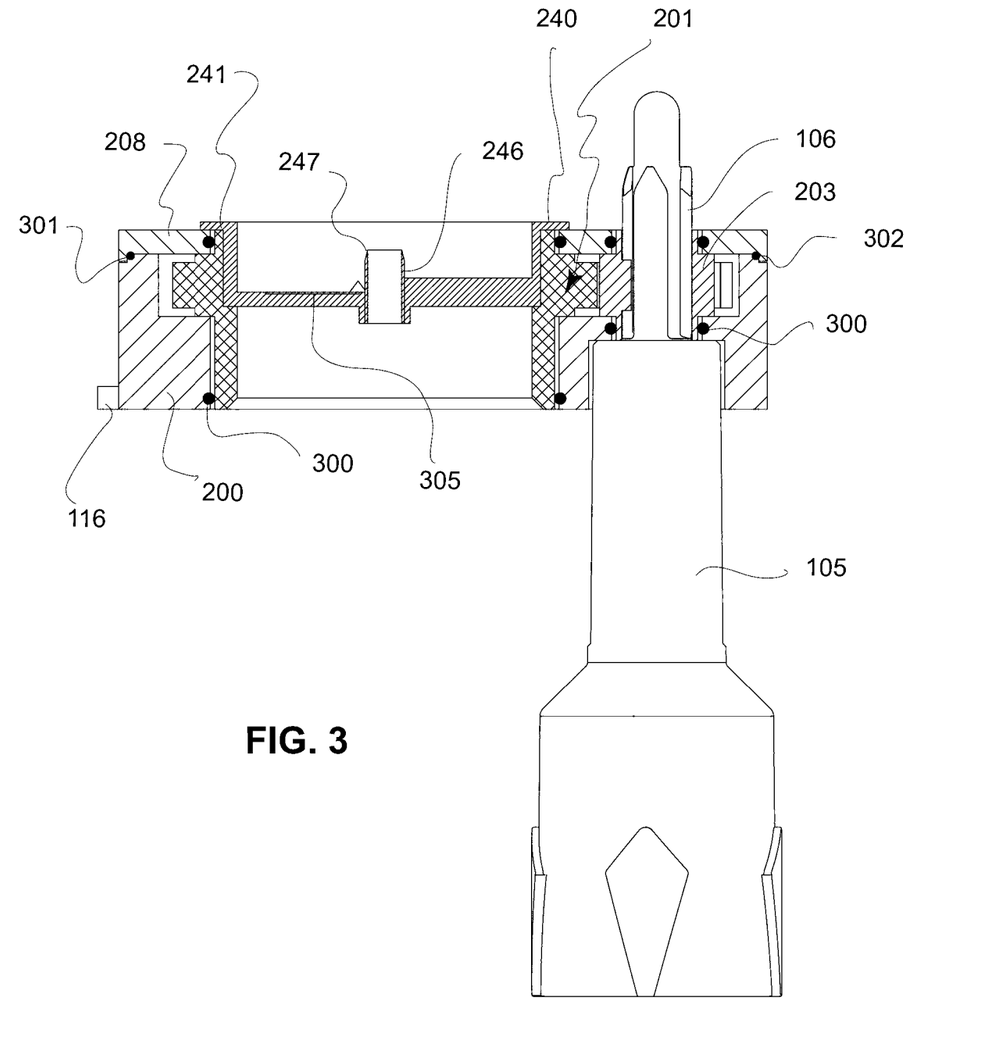
FIG. 3 is a cross sectional view of a spiral cutting accessory and spindle.

As shown in FIG. 3, the body 200 preferably isolates the power train 201 from the environment by the provision of appropriate polymeric seals 300. Seals 300 are provided against the shoulders of the sun gear and in the area of the drive gear 203. The cover 208 may be affixed to the edge of the body 200 by ultrasonic welding 301, or otherwise, e.g. utilising mechanical engagement and optional peripheral seals 302. FIG. 3 suggests that the cutting disk 240 is isolated by seals from the power train. In this example, the locating feature provided by the hollow post 246 is a thin hollow cylinder that allows food to pass through it. The upper rim of the cylinder may be sharpened or treated. In this example, the cutting blade 305 terminates at one end immediately adjacent to or in contact with the outside surface of the feature 246.

Figure 4:
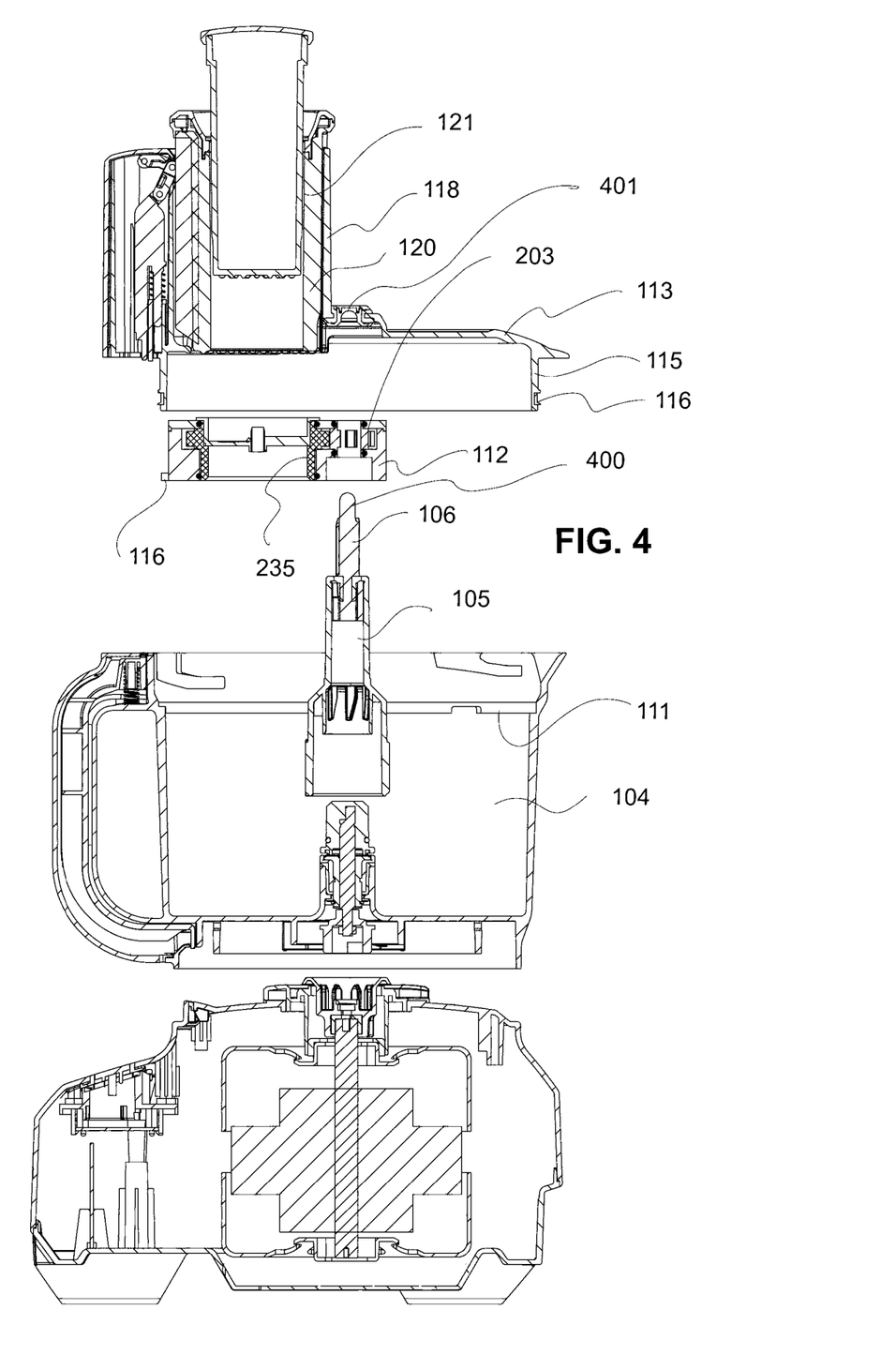
FIG. 4 is an exploded cross section of a food processor and accessory.

As shown in FIG. 4, the accessory 112 fits over the splines 106 to provide input power to the drive gear 203. The lower rim 116 is seated above the internal rim or flange 111 and the body is prevented from rotating. The bore of the sun gear 235 is in alignment with the feedtube 118 and more particularly with the optional secondary feedtube 121 formed through or otherwise defined by the insert 120 (if there is one).

FIG. 4 also suggests that the precision rounded tip 400 of the spindle 105 can be stabilised by a receiving bushing 401 that is accessible from an underside of the lid 113. The stabilisation provided by the bushing 401 is enhanced by a snug interconnection between side wall and seals 115, 116 of the lid and the interior surfaces of the bowl 104. The receiving bushing 401 may be hard plastic or metal supported by a softer resilient polymer.

Figure 5:
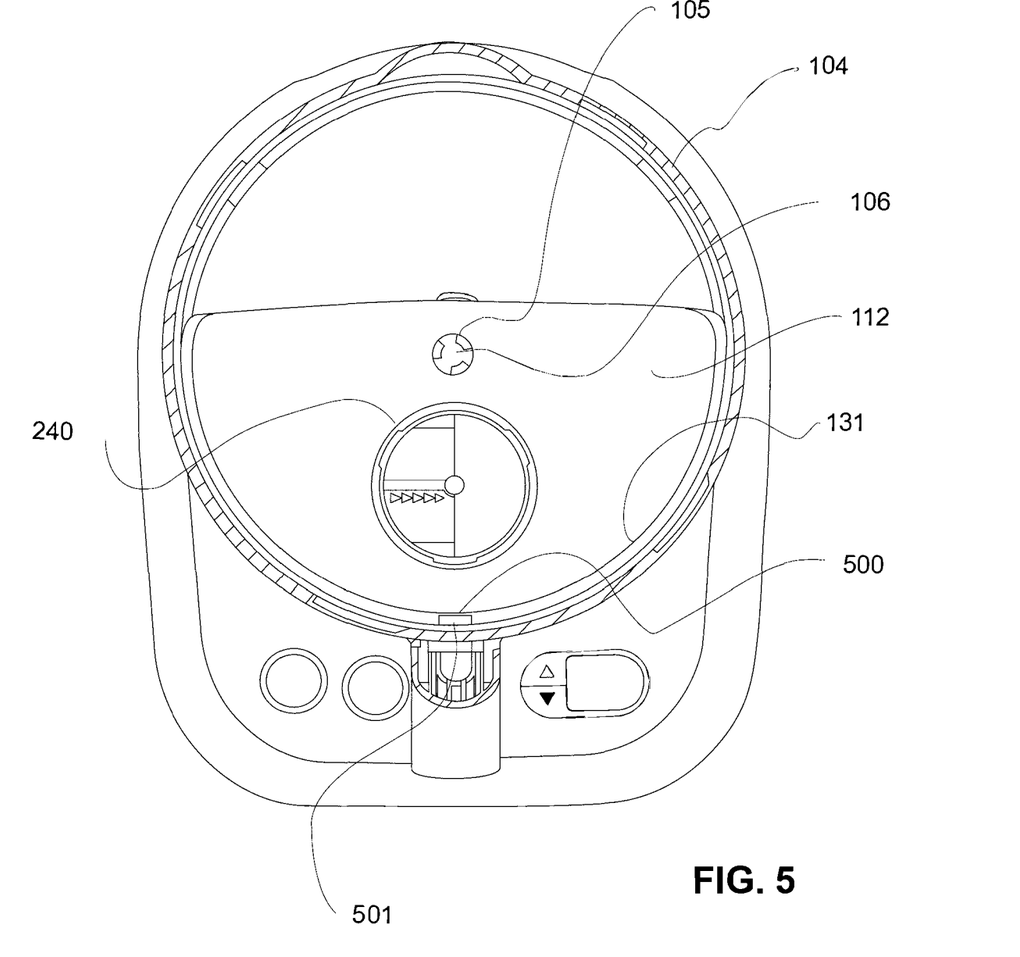
FIG. 5 is a top plan view of a food processor and a spiral cutting accessory, with the lid removed.

As shown in FIG. 5, the lower or supporting rim 131 of the accessory 112 may be provided with one or more notches or other features 500 that are restrained by a cooperating male features 501, located within the mouth opening area of the jug 104. This keying or engagement between the notches 500 and the cooperating male features 501 prevents the accessory 112 from rotating relative to the bowl when driven by the spindle 105. FIG. 5 illustrates that the accessory 112 in the example has a single continuous edge-to-edge engagement with the interior of the bowl. The contact between the accessory 112 and the bowl 104 need not be continuous or singular. FIG. 5 also shows that the rotational center of the cutting disk 240 is laterally offset from the rotational center of the spindle 105.

Figure 6:
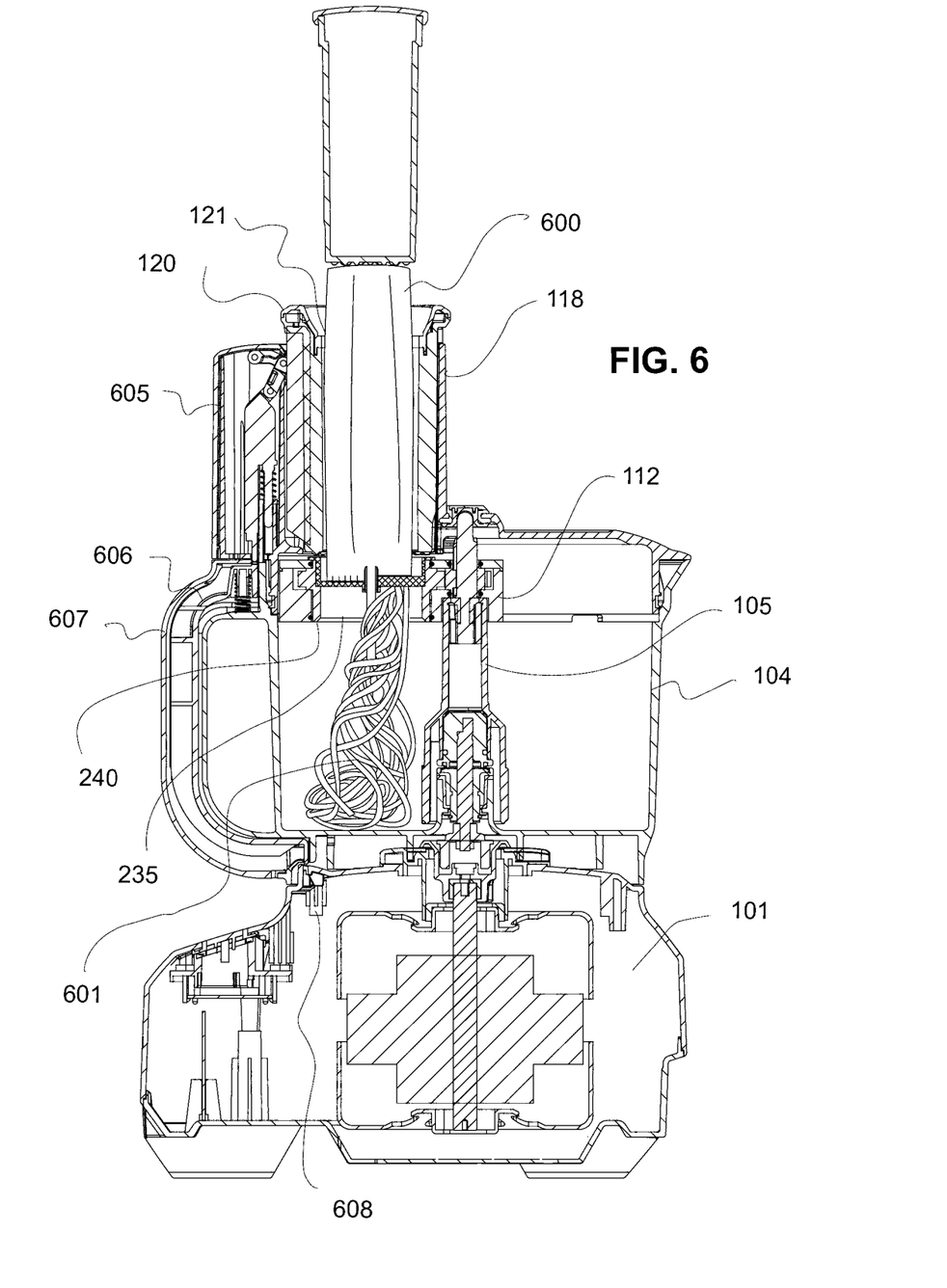
FIG. 6 is a cross sectional view of a food processor with spiral cutting accessory, in use.

As shown in FIG. 6, the accessory 112 is essentially immobilised with reference to the bowl 104. Rotation of the spindle 105 drives the cutting disk 240. The rotational speed of the output gear or sun gear 235 may be different from and is preferably less than the rotational speed of the spindle 105. A food 600 is urged through the feedtube 118 or secondary feedchute 121 directly onto the cutting disk and into engagement with it. Spiral cut foods 601 are conveniently collected within the bowl 104. In this example, the feedtube insert 120 cooperates with a safety cut out mechanism 605 in the same way as the feedtube's primary pusher (not shown) would. The particular mechanical lockout 605 cooperates with a linkage 606 that passes through the handle 607 of the bowl 104. The linkage 606 cooperates with a sensor, switch or microswitch 608 located in the base 101.

Although the invention has been described with reference to specific examples, it will be appreciated by those skilled in the art that the invention may be embodied in many other forms.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" or "example" means that a particular feature, structure or characteristic described in connection with the embodiment is included in at least one embodiment of the present invention. Thus, appearances of the phrases "in one embodiment" or "in an example" in various places throughout this specification are not necessarily all referring to the same embodiment or example, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the scope of the invention, and it is intended to claim all such changes and modifications as fall within the scope of the invention.

While the present invention has been disclosed with reference to particular details of construction, these should be understood as having been provided by way of example and not as limitations to the scope of the invention.

What is claimed is:

1. A food processor, comprising:
   a lid;
   a bowl;
   a spindle rotatably arranged with the bowl; and
   an accessory device, the accessory device comprising:
      a body having an exterior shaped to cooperate with an interior surface of the bowl such that the body is immobilized against rotation relative to the bowl and the lid;
      the body having a first opening that receives an end of the spindle and a second through opening for locating a cutting disc, wherein the cutting disc is a spiral cutting disc;
      when the cutting disc is aligned with the second through opening, the cutting disc is offset from a rotational center of the spindle; and
      rotation of the spindle causes rotation of the cutting disc relative to the body, such that a food is processable by the food processor to a spiral cut food.

2. The food processor of claim 1, wherein: the bowl has an internal rim and the accessory device rests on the rim.

3. The food processor of claim 1, wherein: the accessory device fits within the bowl when the lid is on.

4. The food processor of claim 1, wherein: the first opening is a through opening.

5. The food processor of claim 1, wherein:
   the spindle passes through the first opening so that a tip of the spindle is stabilized by a bush accessible from an underside of the lid.

6. The food processor of claim 5, wherein: the bush is supported by a resilient polymer.

7. The food processor of claim 5, wherein: the lid has a feed tube with an insert that aligns with the second opening and that cooperates with a safety cut-out mechanism.

8. The food processor of claim 7, wherein: the safety cut-out mechanism passes through a handle of the bowl.

9. The food processor of claim 1, wherein: a locating key extends between the body and the bowl.

10. The food processor of claim 1, wherein: a rotational speed of the cutting disc is less than a rotational speed of the spindle.

11. The food processor of claim 1, further comprising an output gear supported for rotation by the second through opening in the body, whereby rotation of the spindle results in rotation of the output gear.

12. The food processor of claim 11, wherein: the output gear has a second bore in which the cutting disc is removably received, the second bore aligning with the second opening.

13. The food processor of claim 1, wherein:
   the body supports a drive gear that cooperates with the first opening for engaging the end of the spindle, whereby rotation of the drive gear causes rotation of the cutting disc.

14. The food processor of claim 13, wherein: the drive gear is part of a planetary gear train.

15. The food processor of claim 14, wherein:
   the body is sealed such that the cutting disc is isolated from the planetary gear train.

16. The food processor of claim 14, wherein: the planetary gear train has one or more fixed planet gears.

* * * * *